US008930454B1

(12) United States Patent  (10) Patent No.: US 8,930,454 B1
Glance et al.  (45) Date of Patent: Jan. 6, 2015

(54) PROVIDING A SHARED ONLINE SEARCH EXPERIENCE

(75) Inventors: Natalie Glance, Pittsburgh, PA (US);
Matthew Ittigson, Pittsburgh, PA (US);
Matthew Siegler, Pittsburgh, PA (US);
Vineet Buch, Foster City, CA (US);
Mary McGlohon, Pittsburgh, PA (US);
Victoria Tran, Santa Clara, CA (US)

(73) Assignee: Google Inc., Moutain View, CA (US)

( * ) Notice: Subject to any disclaimer, the term of this patent is extended or adjusted under 35 U.S.C. 154(b) by 25 days.

(21) Appl. No.: 13/312,605

(22) Filed: Dec. 6, 2011

(51) Int. Cl.
*G06F 15/16* (2006.01)

(52) U.S. Cl.
USPC .......................................... 709/204; 709/203

(58) Field of Classification Search
CPC ............ H04L 65/4007; H04L 65/4015; H04L 65/403
USPC .................................. 709/204, 203
See application file for complete search history.

(56) References Cited

U.S. PATENT DOCUMENTS

| | | | |
|---|---|---|---|
| 6,484,162 B1 * | 11/2002 | Edlund et al. .................... | 1/1 |
| 7,401,294 B2 | 7/2008 | Chang et al. | |
| 7,640,193 B2 * | 12/2009 | Crespo et al. ................ | 705/26.2 |
| 7,725,526 B1 * | 5/2010 | Kraft .............................. | 709/203 |
| 7,860,852 B2 * | 12/2010 | Brunner et al. ............... | 707/706 |
| 8,055,673 B2 * | 11/2011 | Churchill et al. ............. | 707/767 |
| 8,229,951 B2 * | 7/2012 | Nickell et al. ................ | 707/767 |
| 2009/0089678 A1 * | 4/2009 | Sacco et al. ................... | 715/733 |
| 2010/0114965 A1 * | 5/2010 | Dean et al. .................... | 707/784 |
| 2010/0287183 A1 * | 11/2010 | Kamireddy et al. .......... | 707/769 |
| 2011/0276554 A1 * | 11/2011 | Sheu .............................. | 707/706 |
| 2011/0289155 A1 * | 11/2011 | Pirnazar ........................ | 709/206 |
| 2012/0078870 A1 * | 3/2012 | Bazaz ........................... | 707/706 |
| 2012/0130847 A1 * | 5/2012 | Kalin ............................ | 705/26.7 |
| 2012/0197754 A1 * | 8/2012 | Kalin ............................ | 705/26.8 |

* cited by examiner

*Primary Examiner* — Duyen Doan
(74) *Attorney, Agent, or Firm* — Patent Law Works LLP

(57) ABSTRACT

Allowing users to share an online search experience is disclosed. The method includes hosting an interactive virtual session. The interactive virtual session enables a primary user to control the interactive virtual session. The interactive virtual session is displayed at least in part on a computer associated with the first user. The method further includes providing access to the interactive virtual session to at least one secondary user. The secondary user has limited functionalities for interacting with the virtual session. A search query is received from a computer associated with the primary user. At least one search result is determined based on the received search query. The search results are sent to the computer associated with the user for display as part of the interactive virtual session. The search results include at least one representation of an item of interest in the one or more items of interest.

25 Claims, 18 Drawing Sheets

PROVIDING A SHARED ONLINE SEARCH EXPERIENCE

The present disclosure relates to performing searches for items of interest on the Internet. In particular, the present disclosure relates to allowing users to share an online item search experience. Still more particularly, the present disclosure relates to sharing an online search experience in a multi-party communication space.

BACKGROUND

People often seek input from their friends, family, acquaintances and co-workers about many things. Specifically, people often seek others' input on items that they are interested in or products they are interested in purchasing. With the technological advances of the availability of information on the Internet and ability to shop for things online, users can easily find any item or product of interest online. With the use of e-mail, instant message and other forms of online communication, these users can send other users this information to get feedback on these items of interest. This, however, involves much lag between communications and perhaps a bit of the communication gets lost in the delays experienced. Kludging through various forms of communication proves to be inconvenient and cumbersome task for such exchange of information.

SUMMARY

The present embodiments overcomes the deficiencies and limitations of the prior art by providing a system and method for sharing an online search experience.

In one embodiment, a computer-implemented method for allowing users to share an online search experience is performed on one or more computing devices. The method includes hosting, using the one or more computing devices, an interactive virtual session. The interactive virtual session enables a primary user to control the interactive virtual session. The interactive virtual session is displayed at least in part on a computer associated with the first user. The method further includes providing access to the interactive virtual session to at least one secondary user. A search query is received from a computer associated with the primary user. The search query is associated with one or more items of interest. At least one search result is determined based on the received search query. The search results are sent to the computer associated with the user for display as part of the interactive virtual session. The search results include at least one representation of an item of interest in the one or more items of interest. In some embodiments, no search results are generated and the lack of results are sent to the computer associated with the user.

According to another embodiment, a system for allowing users to share an online search experience includes a search module for hosting an interactive virtual session and providing access to the interactive virtual session to at least one secondary user. The system further includes a primary input receiver module for receiving a search query from a computer associated with the primary user. The search query is associated with one or more items of interest. The system also includes a results processing module for determining search results based on the received search query. A display generation module for sending the search results to the computer associated with the user for display as part of the interactive virtual session is also included. The search results include at least one representation of an item of interest in the one or more items of interest.

BRIEF DESCRIPTION OF THE DRAWINGS

The embodiments are illustrated by way of example, and not by way of limitation in the figures of the accompanying drawings in which like reference numerals are used to refer to similar elements.

DETAILED DESCRIPTION

Figure 1:
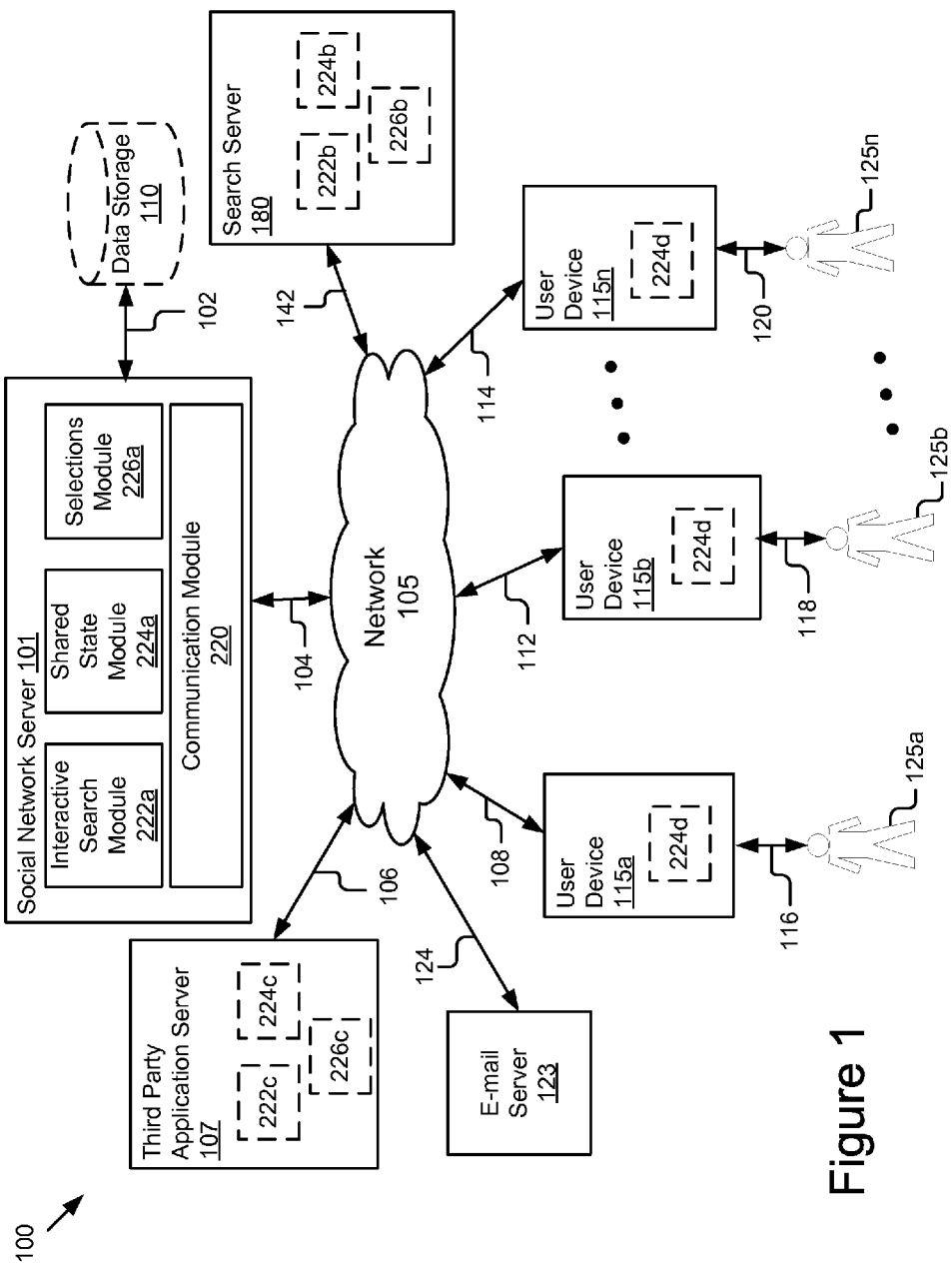
FIG. 1 is a block diagram illustrating a social network system 100 according to one embodiment.

A system and method for allowing users to share an online search experience is described. Multiple users can simultaneously join an interactive virtual space that lets those users share an online search experience where one user searches for an item of interest and the other users in the interactive virtual space can see the search results in real-time. The interactive virtual space can also include a multi-party communication space, such as a video-conferencing environment where users can also speak to one another and see one another while sharing this online search experience. This shared online search experience would replicate users shopping together online. In some embodiments, the users can form a "shopping list" of search results and share that shopping list with each other.

In the following description, for purposes of explanation, numerous specific details are set forth in order to provide a thorough understanding of the embodiments. It will be apparent, however, to one skilled in the art that the embodiments can be practiced without these specific details. In other instances, structures and devices are shown in block diagram form in order to avoid obscuring the embodiments. For example, the present disclosure is described in one embodiment below with reference to user interfaces and particular hardware. However, the present disclosure applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Furthermore, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

System Overview

FIG. 1 illustrates a block diagram of a social network system 100 for sharing an online search experience according to one embodiment. The illustrated social network system 100 includes user devices 115a, 115b, and 115n (also referred to collectively as user devices 115 or individually as user device 115) that are accessed by users 125a, 125b, and 125n (also referred to collectively as users 125 or individually as user 125), a social network server 101, a search server 180, a third party application server 107 and an e-mail server 123. In the illustrated embodiment, these entities are communicatively coupled via a network 105. Although only three user devices 115a/115b/115n are illustrated, any number of user devices 115a/115b/115n are available to any number of users 125a/125b/125n.

The illustrated embodiments of a social network system 100 includes user devices 115a, 115b that are accessed by users 125a, 125b, a social network server 101 that is coupled to data storage 110 and a third party application server 107. In the illustrated embodiment, these entities are communicatively coupled via a network 105. The user devices 115a, 115b, 115n in FIG. 1 are used by way of example. While FIG. 1 illustrates three devices, the present disclosure applies to any system architecture having one or more user devices. Furthermore, while only one network 105 is coupled to the user devices, 115a, 115b, 115n the social network server 101 and the third party application server 107, in practice any number of networks 105 can be connected to the entities.

Although only one social network server 101 is shown, it will be recognized that multiple servers may be present. A social network is any type of socia101/ structure where the users are connected by a common feature. Examples include, but are not limited to, blogs, microblogs and Internet forums. The common feature includes friendship, family, a common interest, etc.

Figure 2:
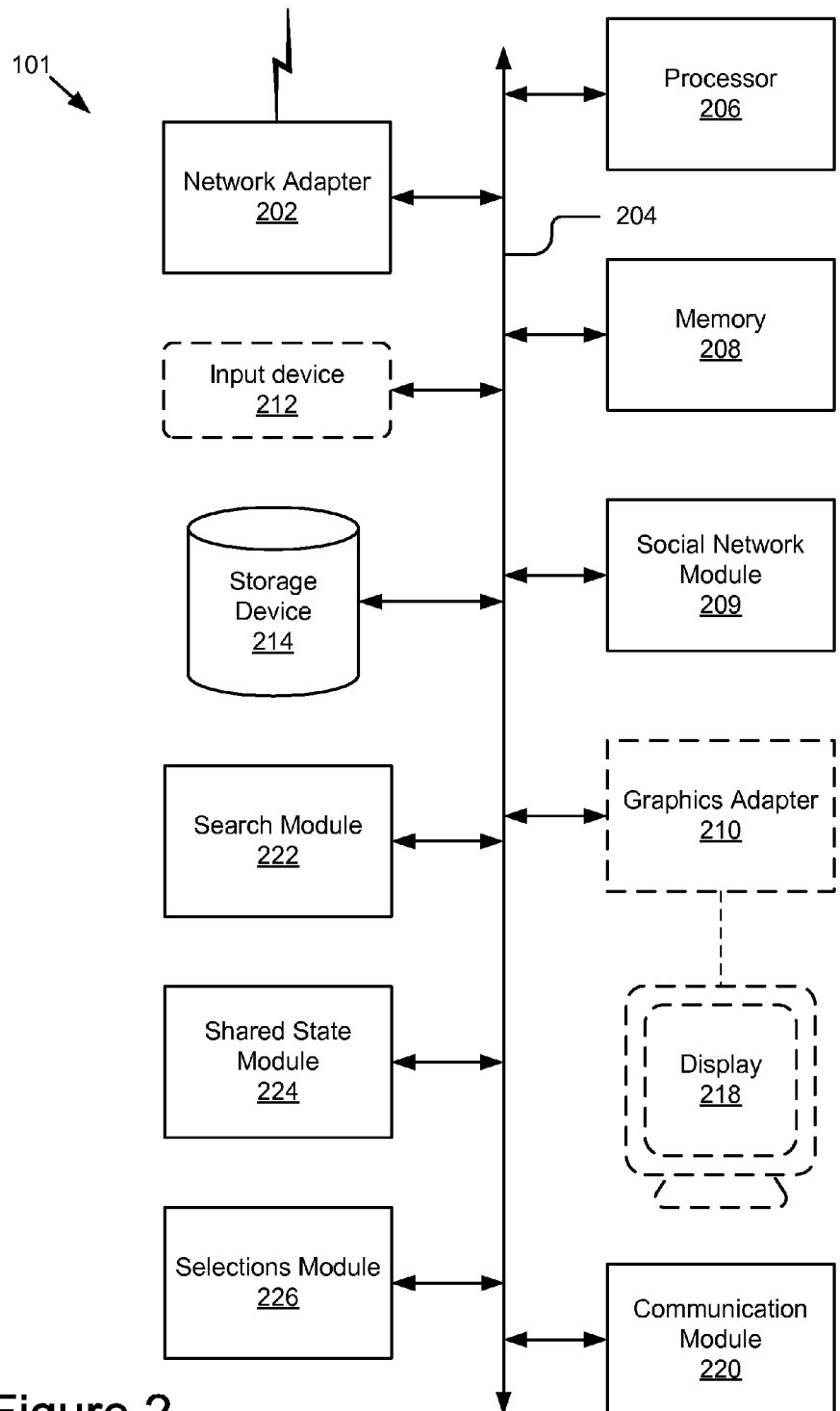
FIG. 2 is a block diagram of an embodiment of a social network server in accordance with one embodiment.

In one embodiment, the social network server 101 is coupled to the network 105 via signal line 104. The social network server 101 also includes a social network module 209 (as shown in FIG. 2). Although only one social network server 101 is shown, persons of ordinary skill in the art will recognize that multiple servers may be present. A social network is any type of social structure where the users are connected by a common feature, for example, Orkut. The common feature includes relationships/connections, e.g., friendship, family, work, an interest, etc. The common features are provided by one or more social networking systems, such as those included in the system 100, including explicitly-defined relationships and relationships implied by social connections with other online users, where the relationships form a social graph. In some examples, a social graph can reflect a mapping of these users and how they are related. Furthermore, it should be understood that social network server 101 and social module 209 (FIG. 2) are representative of one social network and that there may be multiple social networks 101b . . . . 101n coupled to the network 105, each having its own server, application and social graph (not shown). For example, a first social network may be more directed to business networking, a second more directed to or centered on academics, a third is more directed to local business, a fourth directed to dating and others of general interest or a specific focus.

In one embodiment, a search module 222a is included in the social network server 101 and is operable on the social network server 101, which is connected to the network 105 via signal line 104. In another embodiment, the search module 222b is included in the search server 180 and is operable on the search server 180, which is connected to the network 105 via signal line 142. In another embodiment, the search module 222c is included in the third party application server 107 and is operable on the third party application server 107, which is connected to the network 105 via signal line 106. It will be recognized that the search module 222a/222b/222c (referred to generally as the search module 222) can be stored in any combination on the servers. In some embodiments the search module 222 includes multiple, distributed modules that cooperate with each other to perform the functions described below. Details describing the functionality and components of search module 222 are explained in further detail below with regard to FIG. 3.

In one embodiment, a shared state module 224a is included in the social network server 101 and is operable on the social network server 101, which is connected to the network 105 via signal line 104. In another embodiment, the shared state module 224b is included in the search server 180 and is operable on the search server 180, which is connected to the network 105 via signal line 142. In another embodiment, the shared state module 224c is included in the third party application server 107 and is operable on the third party application server 107, which is connected to the network 105 via signal line 106. In another embodiment, the shared state module 224d is included in the user devices 115a, 115b, 115n and is operable on the user device 115, which is connected to the network 105 via signal lines 108, 112 and 114. Details describing the functionality of the shared state module 224d being located on the user device 115 will be discussed in more detail below. It will be recognized that the shared state module 224a/224b/224c (referred to generally as the shared state module 224) can be stored in any combination on the servers. In some embodiments the shared state module 224 includes multiple, distributed modules that cooperate with each other to perform the functions described below. Details describing the functionality and components of shared state module 224 are explained in further detail below with regard to FIG. 4.

In one embodiment, a selections module 226a is included in the social network server 101 and is operable on the social network server 101, which is connected to the network 105 via signal line 104. In another embodiment, the selections module 226b is included in the search server 180 and is operable on the search server 180, which is connected to the network 105 via signal line 142. In another embodiment, the selections module 226c is included in the third party application server 107 and is operable on the third party application server 107, which is connected to the network 105 via signal line 106. It will be recognized that the selections module 226a/226b/226c (referred to generally as the selections module 226) can be stored in any combination on the servers. In some embodiments selections module 226 includes multiple, distributed modules that cooperate with each other to perform the functions described below. Details describing the functionality and components of selections module 226 are explained in further detail below with regard to FIG. 5.

The network 105 enables communications between user devices 115a, 115b, the social network server 101 and the third part application server 107. Thus, the network 105 can include links using technologies such as Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above. Depending upon the embodiment, the network 105 can also include links to other networks.

In one embodiment, the network 105 is a partially public or a wholly public network such as the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial—or satellite-based transceivers). In one embodiment, the network 105 is an IP-based wide or metropolitan area network.

The communication module 220 is software and routines that, when executed by a processor, allow for communication between users 125 of user devices 115. In some embodiments, the communication module 220 facilitates audio communication between users 125 of user devices 115. In other embodiments, communication module 220 facilitates video communication between users 125 of user devices 115. In yet other embodiments, the communication module 220 facilitates both audio communication and video communication between users 125 of user devices 115. In some embodiments, the communication module 220 facilitates simultaneous audio and/or video communication between multiple users 125 of user devices 115.

In the illustrated embodiment, the user device 115a is coupled to the network 105 via signal line 108. The user 125a can interact with the user device 115a as illustrated by signal line 116. The user device 115b is coupled to the network via signal line 112. The user 125b is can interact with the user device 115b as illustrated by signal line 114. The third party application server 107 is communicatively coupled to the network 105 via signal line 106. The social network server 101 is communicatively coupled to the network 105 via signal line 104. The social network server 101 is also communicatively coupled to data storage 110 via signal line 102.

Data storage 110 stores data and information of users 125a/125b/125n of the social network system 100. Such stored information includes user profiles and other information identifying the users 125a/125b/125n of the social network system 100. Examples of information identifying users includes, but is not limited to, the user's name, contact information, sex, relationship status, likes, interests, links, education and employment history, location, political views, and religion. In one embodiment, the information stored in data storage 110 also includes the user's list of current and past friends and the user's activities within the social network system 100, such as anything the user posts within the social network system and any messages that the user sends to other users.

In one embodiment, a user device 115a, 115b, . . . or 115n is an electronic computing device having a web browser for interacting with the social network server 101 via the network 105 and is used by user 125a, 125b, 125n to access information in the social network system 100. The user device 115a, 115b, 115n can be a computing device, for example, a laptop computer, a desktop computer, a tablet computer, a mobile telephone, a personal digital assistant (PDA), a mobile email device, a portable game player, a portable music player, a television with one or more processors embedded therein or coupled thereto, or any other electronic device capable of accessing a network. A server can also be a computing device.

In some embodiments, a primary user is the user who initiates the interactive virtual session and the secondary users are the participants of that interactive virtual session. In some embodiments, the primary user has control of the interactive virtual session, and as will be explained below, can input search queries to generate search results that are viewable by the secondary users. For purposes of illustration, in some portions of this disclosure, the primary user is the user 125a of user device 115a and the secondary user or users are users 125b, 125n of user devices 115b, 115n. In some embodiments, as will be explained in further detail below, users can switch from being a primary user (user in control) to a secondary user and vice versa.

Example Social Network Server

FIG. 2 is a block diagram of an embodiment of a social network server 101 in accordance with one embodiment. As illustrated in FIG. 2, the social network server 101 includes a network adapter 202 coupled to a bus 204. Also coupled to the bus 204 are at least one processor 206, memory 208, a graphics adapter 210, a keyboard, 212, a storage device 214, and a pointing device 216. In one embodiment, the functionality of the bus 204 is provided by an interconnecting chipset. The social network server 101 also includes a display 218, which is coupled to the graphics adapter 210. As illustrated in FIG. 2, embodiments of a social network server 101 can include a social network module 209, a communications module 220, search module 222, a shared state module 224 and a selections module 226.

The processor 206 may be any general-purpose processor. The processor 206 comprises an arithmetic logic unit, a microprocessor, a general purpose controller or some other processor array to perform computations, provide electronic display signals to display 218. The processor 206 is coupled to the bus 204 for communication with the other components of the social network server 101. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The social network server 101 also includes an operating system executable by the processor such as but not limited to WINDOWS®, MacOS X, Android, or UNIX® based operating systems.

The memory 208 holds instructions and data used by the processor 206. The instructions and/or data comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory such as a hard disk drive or flash drive for storing log information on a more permanent basis. The memory 208 is coupled by the bus 204 for communication with the other components of the social network server 101.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 206 and comprises one or more devices including a hard disk drive, a floppy disk drive, a CD-ROM device, a DVD-ROM device, a DVD-RAM device, a DVD-RW device, a flash memory device, or some other mass storage device known in the art.

The pointing device 212 may be a mouse, track ball, or other type of pointing device, and is used in combination with another input device 212, such as a keyboard to input data into the social network server 101. The graphics adapter 210 displays images and other information on the display 218. The display 218 is a conventional type such as a liquid crystal display (LCD) or any other similarly equipped display device, screen, or monitor. The display 218 represents any device equipped to display electronic images and data as described herein. The network adapter 202 couples the social network server 101 to a local or wide area network.

In one embodiment, the social network module 209 is software and routines executable by a processor to control the interaction between the social network server 101, storage device 214 and the user devices 115a, 115b, 115n. An embodiment of the social network module 209 allows users 125a, 125b, 125n of user devices 115a, 115b, 115n to perform social functions between other users 125a, 125b, 125n of user devices 115a, 115b, 115n within the social network system 100.

The communication module 220 is software and routines that, when executed by a processor, allow for communication between users 125 of user devices 115. In some embodiments, the communication module 220 facilitates audio communication between users 125 of user devices 115. In other embodiments, communication module 220 facilitates video communication between users 125 of user devices 115. In yet other embodiments, the communication module 220 facilitates both audio communication and video communication between users 125 of user devices 115. In some embodiments, the communication module 220 facilitates simultaneous audio and/or video communication between multiple users 125 of user devices 115.

The search module 222 is software and routines that, when executed by a processor, processes search queries and allows for multiple users to share an online search experience. In some embodiments, the search module 222 communicates with the e-mail server 123 and allows users 125 to send search results to a recipient via e-mail. Details describing the components and functionality of the search module 222 will be described in further detail below with regard to FIG. 3.

As will be illustrated in the disclosure, the search queries may be associated with any item of interest. In some embodiments, a search query may describe a product or other item of interest. In other embodiments, a search query may relate to travel items, such as hotel accommodations or airline tickets. The search query can relate to item or query that is searchable online.

The shared state module 224 is software and routines that, when executed by a processor, maintains the shared state for users in an online search experience. In some embodiments, the shared state module 224 allows for multiple users to share an online search experience by updating the statuses of users 125 participating in the online search experience and managing communication between secondary users and the search module 222. In some embodiments, the shared state module 224 exists on the user devices 115. Details describing the components and functionality of the shared state module 224 will be described in further detail below with regard to FIG. 4.

The selections module 226 is software and routines that, when executed by a processor, stores selections by users participating in the shared online search experience. In some embodiments, the selections module allows users to add to and remove selections. Details describing the components and functionality of the selections module 226 will be described in further detail below with regard to FIG. 5.

As is known in the art, the social network server 101 can have different and/or other components than those shown in FIG. 2. As is known in the art, the social network server 101 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 214, loaded into the memory 208, and executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Example Search Module

Figure 3:
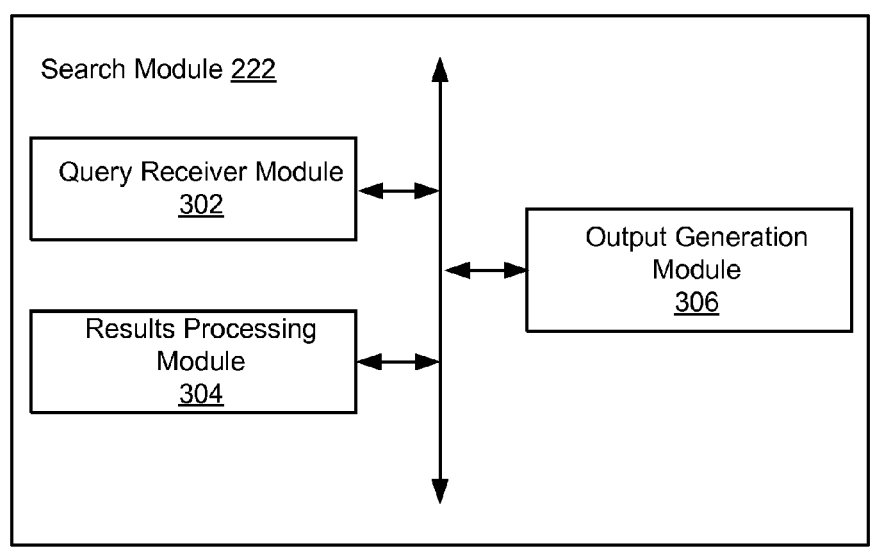
FIG. 3 is a block diagram illustrating modules within a search module of the social network server according to one embodiment.

FIG. 3 is a block diagram illustrating modules within the search module 222 according to one embodiment. As stated above, the search module 222 is software and routines executable by the processor to process search queries and allow multiple users to share an online search experience. According to one embodiment, the search module 222 includes a query receiver module 302, a results processing module 304 and an output generation module 306.

The search module 222 receives search queries from user devices 115 is configured to communicate with the user devices 115 to receive such search queries. In some embodiments, the search module 222 is also configured to communicate with the shared state module 224 and receive search queries from the shared state module 224. In such embodiments, the search queries were sent by secondary users (of user devices 115) of the online search experience to the shared state module 224.

The query receiver module 302 of the search module 222 is software and routines for receiving search queries from a user 125 of a user device 115 and also receiving search queries from shared state module 224. The query receiver module 302 is coupled to communicate with the results processing module 304 and send search queries to be processed by the results processing module 304. In some embodiments, the search queries received from user devices are primary inputs and the search queries received from the shared state module 224 are secondary inputs. In one embodiment, the query receiver module 302 is a set of instructions executable by a processor to provide the functionality described herein. In another embodiment, the query module 302 is stored in the memory of the social network server 101 and is accessible and executable by a processor.

The results processing module 304 of the search module 222 is software and routines for processing inputs and search queries to produce search results. In one embodiment, the results processing module 304 is a set of instructions executable by a processor to provide the functionality described herein. In another embodiment, the results processing module 304 is stored in the memory of the social network server 101 and is accessible and executable by a processor. In some embodiments, the results processing module 304 is couple to communicate with the query receiver module 302 in order to receive queries from query receiver module 302 and is also coupled to communicate with the output generation module 306 to send search results to the output generation module 306 to eventually be sent to the user devices 115 for display.

The output generation module 306 of the search module 222 is software and routines for receiving search results from the results processing module 304 and sending the results to user devices 115 for display. In one embodiment, the output generation module 306 is a set of instructions executable by a processor to provide the functionality described herein. In another embodiment, the output generation module 306 is stored in the memory of the social network server 101 and is accessible and executable by a processor. The output generation module configured to communicate with the results processing module 304 and user devices 115.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Example Shared State Module

Figure 4:
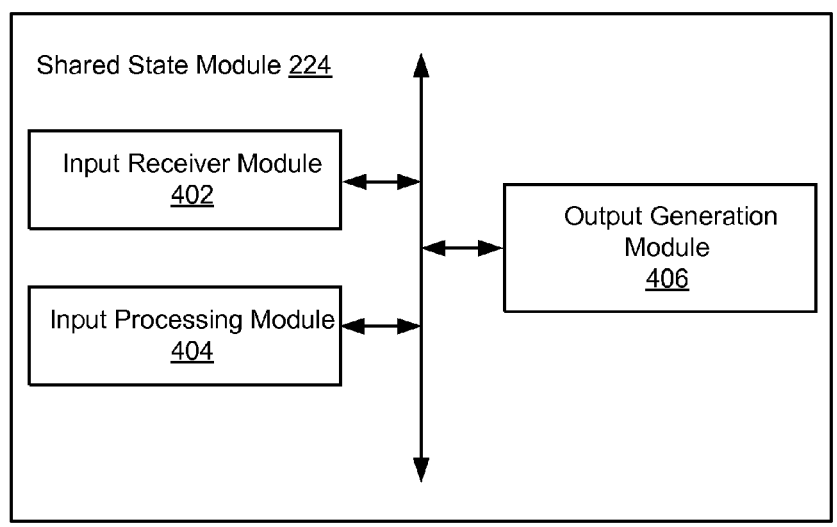
FIG. 4 is a block diagram illustrating modules within a shared state module of the social network server according to one embodiment.

Now referring to FIG. 4, a block diagram illustrating modules within the shared state module 224 is shown according to one embodiment. As stated above, in various embodiments, the shared state module may be software and/or routines executable by the processor to maintain a shared state and allow multiple users to share an online search experience. According to one embodiment, the shared state module 224 includes an input receiver module 402, an input processing module 404 and an output generation module 406.

In one embodiment, the shared state module 224 is configured to communicate with user devices 115 and receive search queries from the user devices 115. In some embodiments, the shared state module receives search queries from a primary user of user device 115a and sends the search query received from the primary user of user device 115a to a secondary user of user device 115b. This search query then is sent from the secondary user of user device 115b to the search module 222 for processing and result generation back to the secondary user of user device 115b. In some embodiments, the shared state module 224 receives search queries from a secondary user of user device 115b. In this embodiment, in response to receiving such query from the secondary user, a request to chance control to the secondary user gets sent to the primary user of user device 115a. In one embodiment, the shared state module 224 received other inputs from the primary and secondary users of user devices 115a, 115b, for example, inputs related to the primary user scrolling through search results or the primary user or secondary user mousing-over an item within the search results. Details regarding this are discussed below.

The input receiver module 402 of the shared state module 224 is software and routines for receiving inputs from user devices 115. The input received module is configured for communication with the user devices 115 and is also coupled to communicate with the input processing module. The input processing module 404 of the shared state module 224 is software and routines for processing inputs received by the input receiver module 402. The input processing module 404 is coupled to communicate with the input receiver module 402 and the output generation module 406. The output generation module 406 of the shared state module 224 is software and routines for outputting data processed by the input processing module 404 and is coupled to communicate with the input processing module 404 and is also configured to communicate with user devices 115.

In one embodiment, the input receiver module 402 of the shared state module 224 receives a search query from a primary user of the user device 115a. The input receiver module 402 sends the search query to the input processing module 404. The input processing module 404 determines that the search query originated from the primary user of user device 115a, and sends the search query to the output generation module 406, which then sends the query to secondary users of user devices 115b, 115n. The secondary users of user devices 115b, 115n send the search query to the search module 222, which then processes the search results and sends them back to the secondary users of user devices 115b, 115n for display on the user devices 115b, 115n.

According to one embodiment, the input receiver module 402 of the shared state module 224 receives a search query from a secondary user of the user device 115b. The input receiver module 402 sends the search query to the input processing module 404. The input processing module 404 determines that the search query originated from the secondary user of user device 115b sends instructions to the output generation module 406 to send a request to the user device 115a of the primary user requesting change of control of the search to the secondary user.

Figure 10:
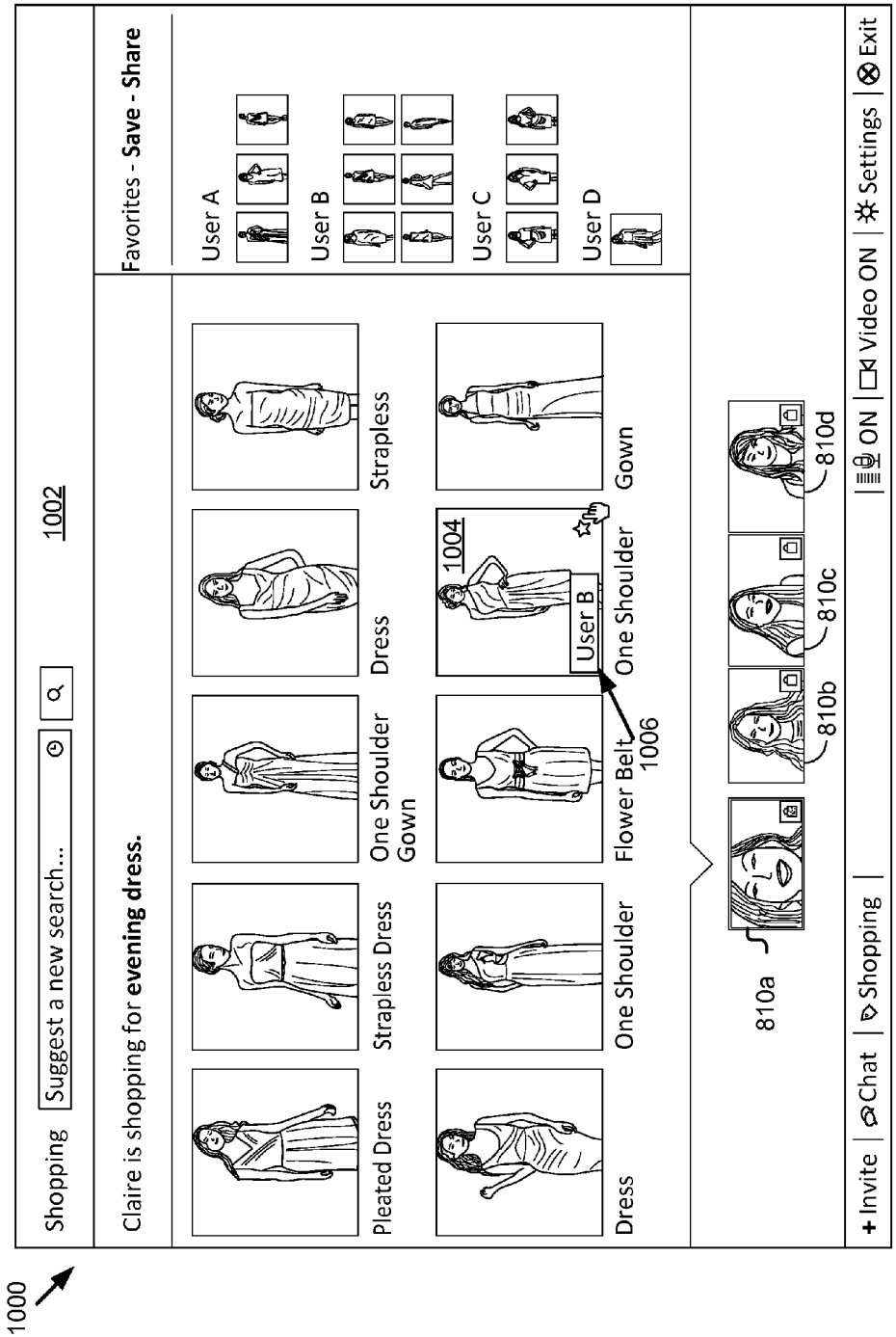
FIG. 10 is yet another example graphical user interface of a web portal for sharing an online search experience in accordance with one embodiment.
Figure 11:
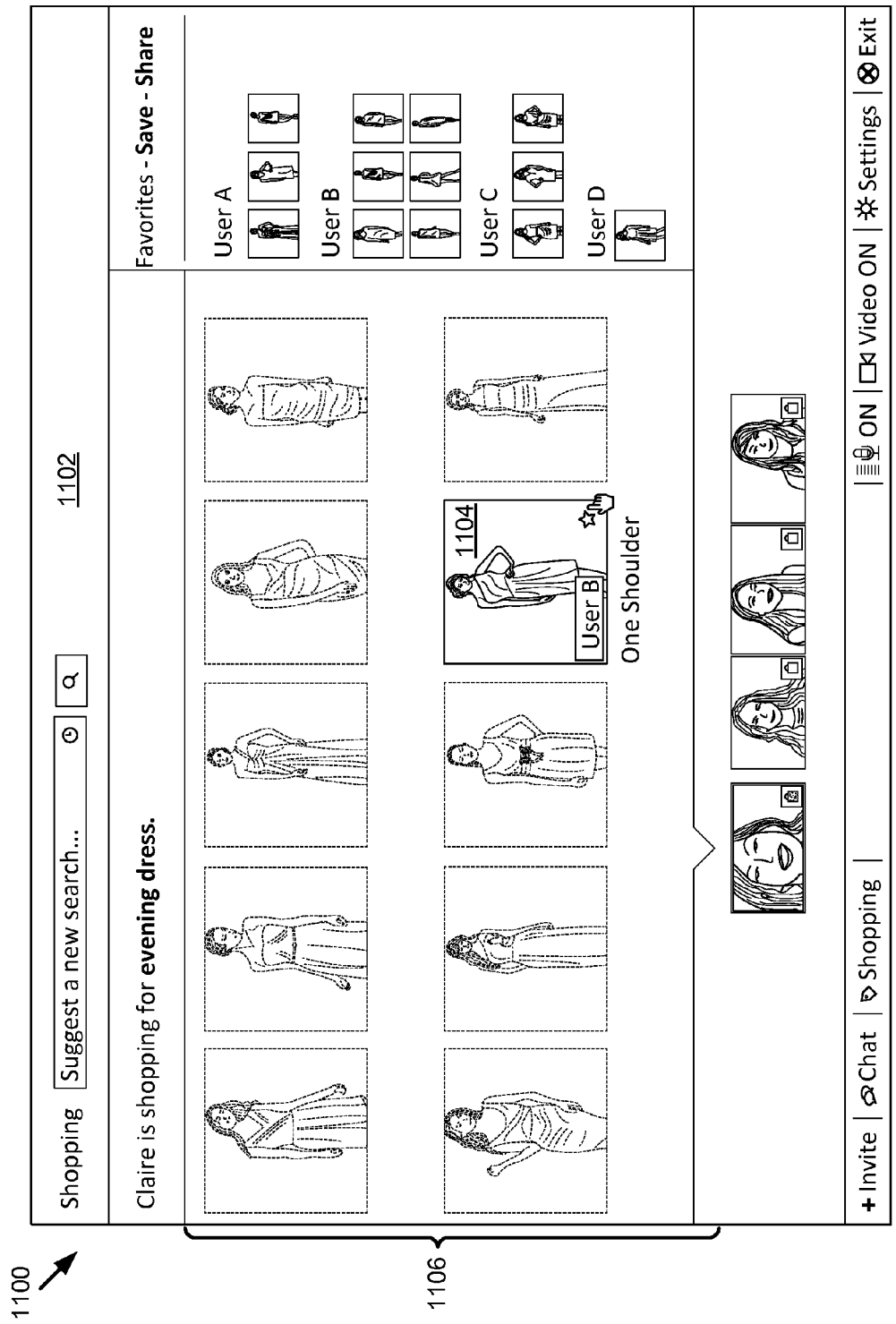
FIG. 11 is an example graphical user interface of a web portal for sharing an online search experience in accordance with yet another embodiment.
Figure 12:
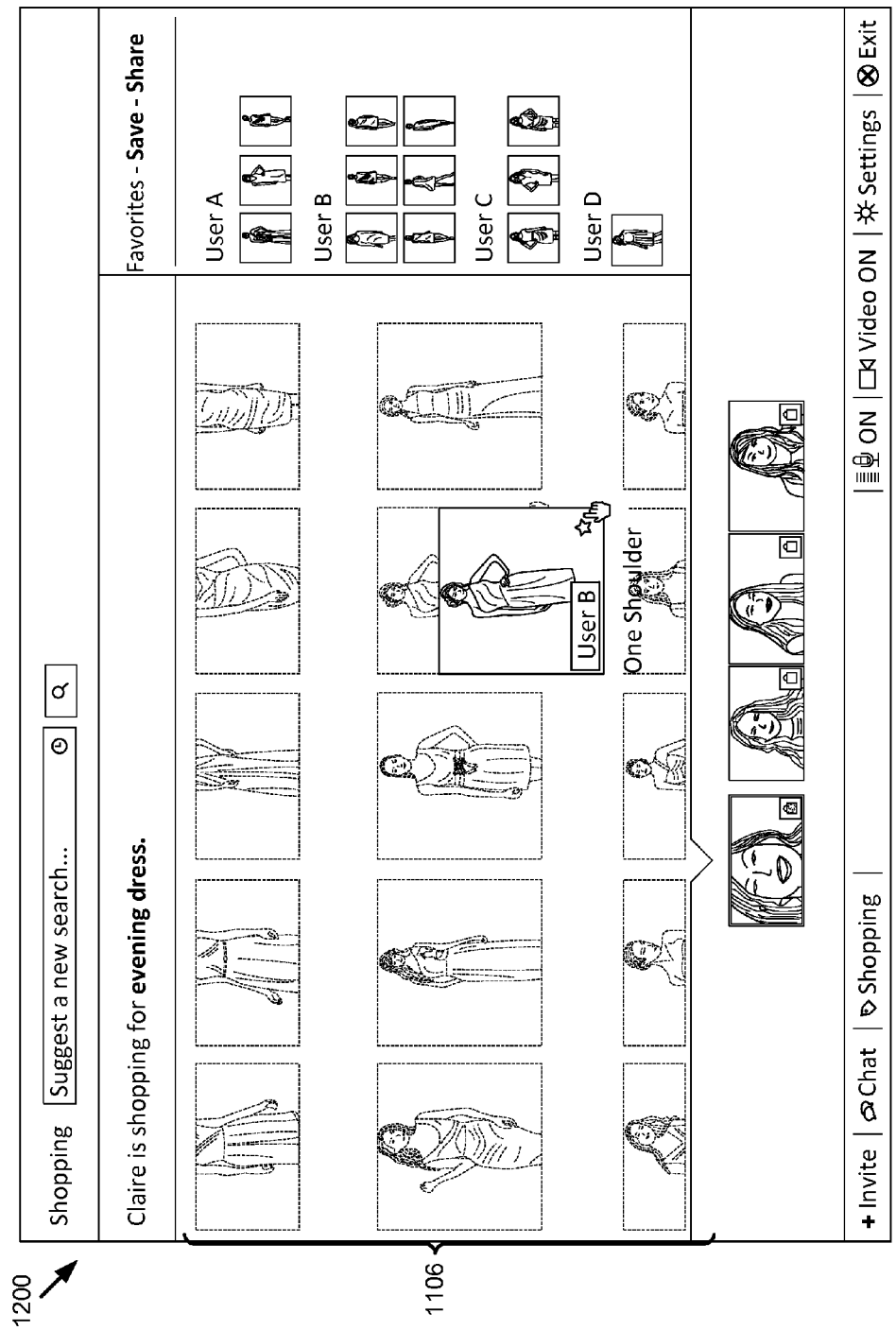
FIG. 12 is an example graphical user interface of a web portal for sharing an online search experience in accordance with yet another embodiment.

In some embodiments, the input receiver module 402 of the shared state module 224 receives an input from a user 125 of a user device 115 (which can be from a primary user or a secondary user) wherein the input indicates the user 125 is mousing-over a search result being displayed for a predetermined amount of time. The input receiver module 402 sends this information to the input processing module 404, which processes this information and updates the state and sends the processes data to the output generation module 406, which send the updated states and processed data to users 125 of user devices 115. In some embodiments, the user devices 115 receive the data from the output generation module 406 of the shared state module 224 and process the data to render a user interface accordingly. In some embodiments, the user interfaces shows the name or equivalent identifier of the user performing this mouse-over on the search result, as seen in FIGS. 10, 11 and 12, which will be discussed in more detail below.

In some embodiments, the input receiver module 402 of the shared state module 224 receives an input from a secondary user of user device 115b wherein the input indicates that the secondary user is interacting with an item in the search results. For example, in some embodiments, the input indicates that the secondary user has selected the item of the search result by clicking on the item. In such embodiments, the input receiver module 402 sends this data to the input processing module 404, which processes the data and send the processed data to the output generation module 406 to send to the secondary user of the user device 115b for display on the user device 115b. In these embodiments, user device 115b may show the selected item as visibly fixed on the page with the search results and show the search results in the background according to other user interactions. For example, if the primary user is scrolling the search results pages, the background could show the search results being scrolled, which keeping the item that is being selected by the secondary user frozen on the screen to allow the secondary user to continue to interact with the item. An example of this is illustrated in FIGS. 11 and 12 to be described in more detail below.

In some embodiments, the input receiver module 402 of the shared state module 224 receives inputs from the primary user of user device 115 indicating that the primary user is scrolling through the search results on the results page. The input receiver module 402 sends this data to the input processing module 404, which processes this data and sends it to the output generation module 406 to send to the secondary user of user devices 115b, 115n, which renders a scrolling display on the user devices 115, 115n accordingly.

In some embodiments, as shown in FIG. 1, the shared state module 224 resides on user devices 115 and user devices serve the functionality described above with regard to the functionality of the shared state module 224.

Example Selections Module

Figure 5:
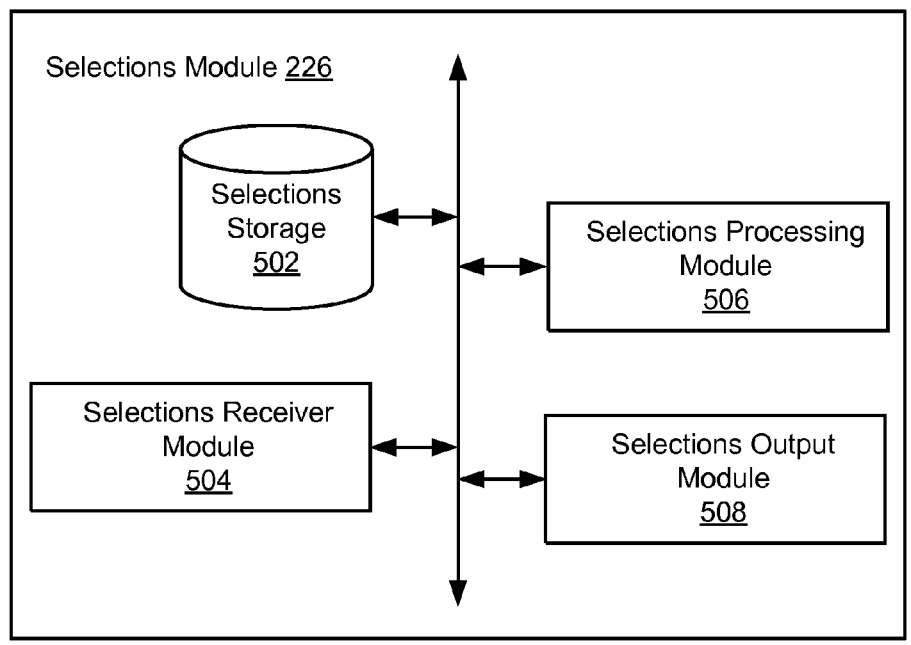
FIG. 5 is a block diagram illustrating modules within a selections module of the social network server according to one embodiment.

FIG. 5 is a block diagram illustrating modules within the selections module 226 according to one embodiment. As stated above, the selections module 226 is software and routines executable by the processor stores selections by users participating in the shared online search experience. According to one embodiment, the selections module 226 includes a selections storage database 502, a selections receiver module 504, a selections processing module 506 and a selections output module 508.

The selections receiver module 504 is couple to communicated with the selections storage database 502. The selections receiver module 504 receives selections from users 125 of user devices 115 and sends the received selections to the selections storage database 502. In some embodiments, the selections storage database 502 stores the selections of items of interest and keeps track of which users have added that item to the selections. The selections processing module 506 is software and routines for processing selections. The selections processing module is coupled to communicate with the selections input module 504, the selections storage module 502 and the selections output module 508. The selections processing module 506 processes the selections and sends it to the selections output module 508, which send it to user devices 115 for display.

In some embodiments, the selections are displayed as items of interest in a list associated with the interactive virtual session. As illustrated in the example graphical user interfaces, which will be discussed in more detail below, in some embodiments, the selections are displayed as favorites in a shopping list associated with the interactive virtual session. In some embodiments, the selections (or favorites) are displayed and grouped according to which user selected the selection (or favorite).

In some embodiments, the selections module 226 communicates with the social network module to allow users to post selections on a social network portal. In some embodiments, users can post selections on their own social network portal. In other embodiments, users can post on the social network portal of another user. In some embodiments, these posts can be public. In yet other embodiments, users can select who can view or have access to the posts of the selections.

Processes

Figure 6:
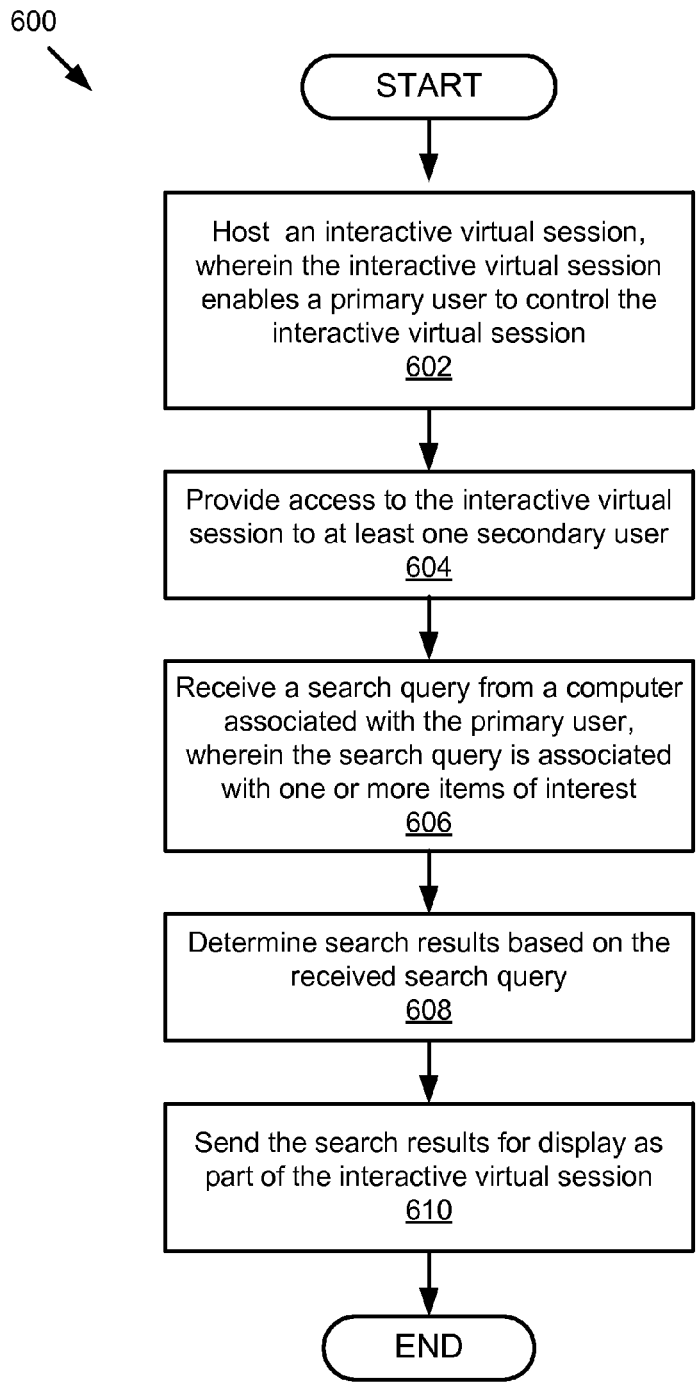
FIG. 6 is a flow chart illustrating an embodiment of a method for allowing users to share an online search experience in accordance one embodiment.
Figure 7:
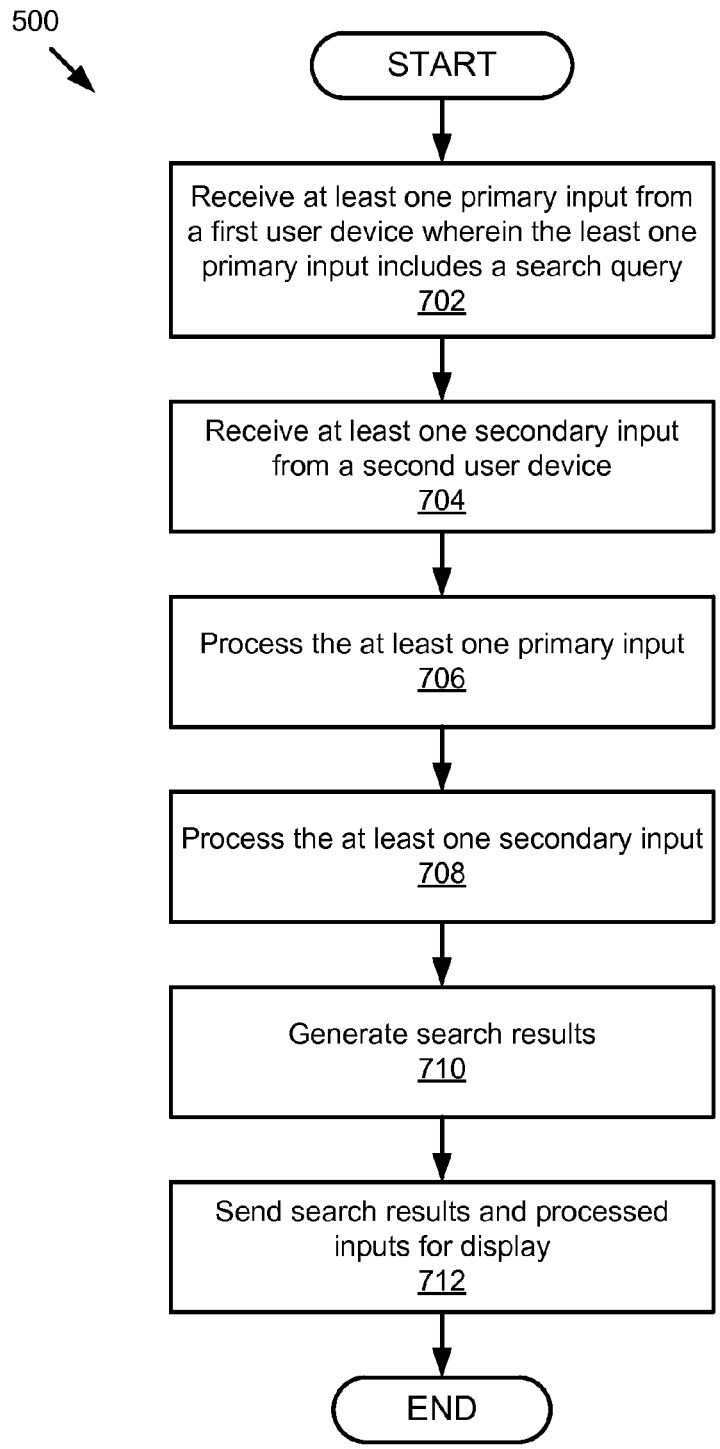
FIG. 7 is a flow chart illustrating an embodiment of a method for processing inputs in a shared search environment according to one embodiment.

Referring now to FIGS. 6 and 7, various embodiments of the processes will be described. In one embodiment illustrated in FIG. 6, a method 600 for allowing users to share an online search experience is performed on one or more computing devices. The method includes hosting 602, using the one or more computing devices, an interactive virtual session. The interactive virtual session enables a primary user to control the interactive virtual session. The interactive virtual session is displayed at least in part on a computer associated with the first user. The method 600 further includes providing 604 access to the interactive virtual session to at least one secondary user. A search query is received 606 from a computer associated with the primary user. The search query is associated with one or more items of interest. At least one search result is determined 608 based on the received search query. The search results are sent 610 to the computer associated with the user for display as part of the interactive virtual session. The search results include at least one representation of an item of interest in the one or more items of interest.

Now referring to FIG. 7, a method 700 for processing inputs in a shared search environment is illustrated. A primary input is received 702 from a primary user of a user device 115a. In some embodiments, the primary input includes at least one search query. A secondary input is received 704 from a secondary user of a user device 115b. The primary input is processed 706. The secondary input is processed 708. Search results are generated 710 and sent 712 for display on the first and second user devices 115a 115b.

Figure 8:
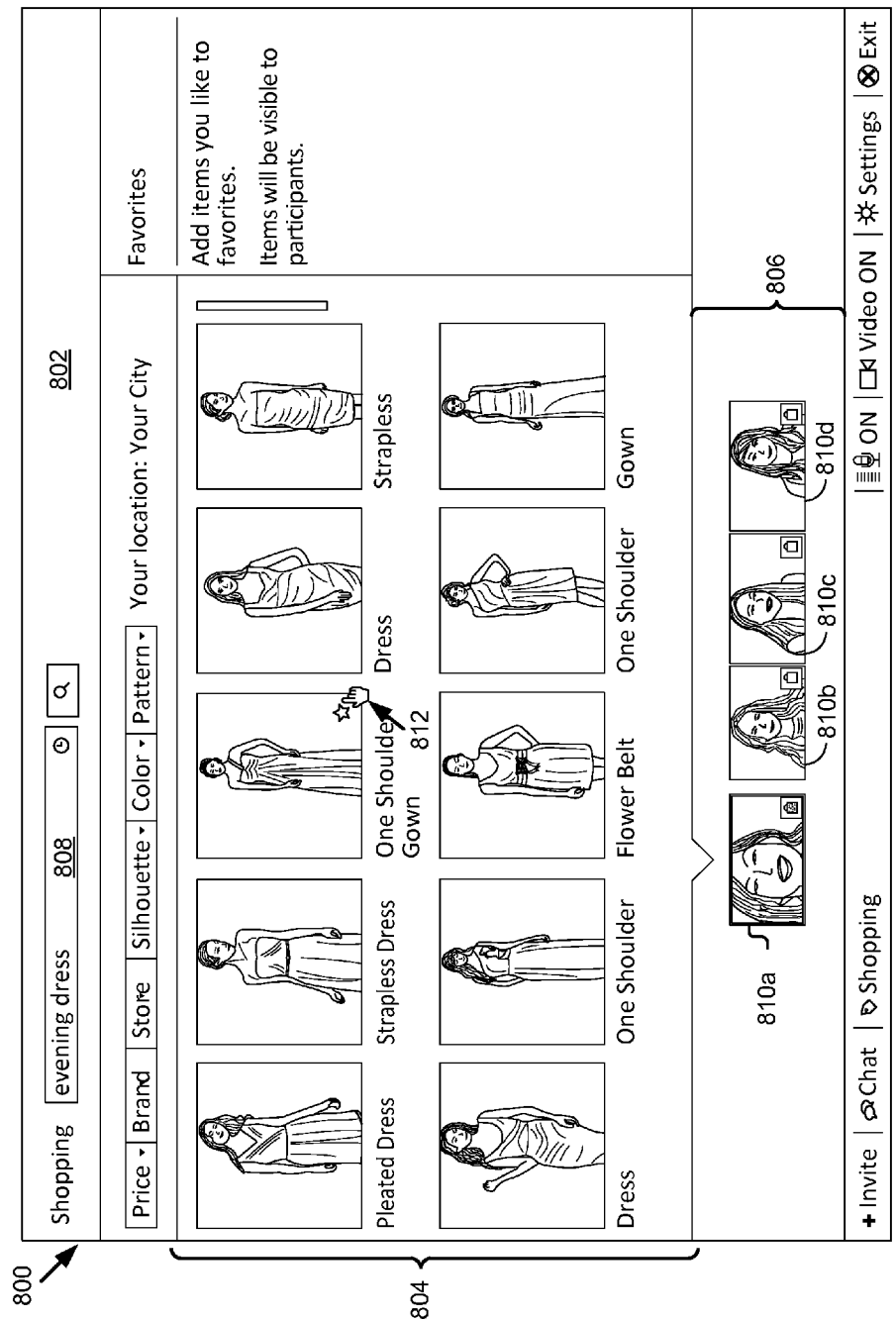
FIG. 8 is an example graphical user interface of a web portal for sharing an online search experience according to one embodiment.

To illustrate the above in an example, FIG. 8 illustrates an example embodiment of an interactive virtual session that provides users the ability to share an online search experience. As seen in FIG. 8, representations 810a-810d depict representation of users participating in a multi-party communication space 806. According to this embodiment, representation 810a is of the primary user controlling the interactive virtual session. The primary user can enter a search query into the search query field 808. The search query is received and search results are displayed in area 804. The participants of the interactive virtual session can view the results. The secondary users represented by representations 810b-810d can input secondary inputs, such as mousing over an item within the search results and adding selections (or favorites) to the favorites area.

Example User Interfaces

FIG. 8 is an example graphical user interface 800 of a web portal 802 for sharing an online search experience according to one embodiment. The web portal 802 includes an area 804 displaying an interactive virtual session. The interactive virtual session displays items of interest once a search query is inputted. According to the embodiment illustration in FIG. 8, the web portal 802 also includes a multi-party communication space 806. The web portal 802 also includes a query input field 808 for users to enter search queries.

As illustrated in the embodiment shown in FIG. 8, multi-party communication space 806 may display video or other representations 810a-810d of participating users. In this embodiment, the multi-party communication includes both audio and video communication. As illustrated in this figure, a distinct bold bordering the image of user 810a indicates that this user is the primary user inputting primary inputs into the system. In other embodiments, this is shown by another distinct identifier or marker, for example, a different color bordering the primary user or some other identifier.

Figure 9:
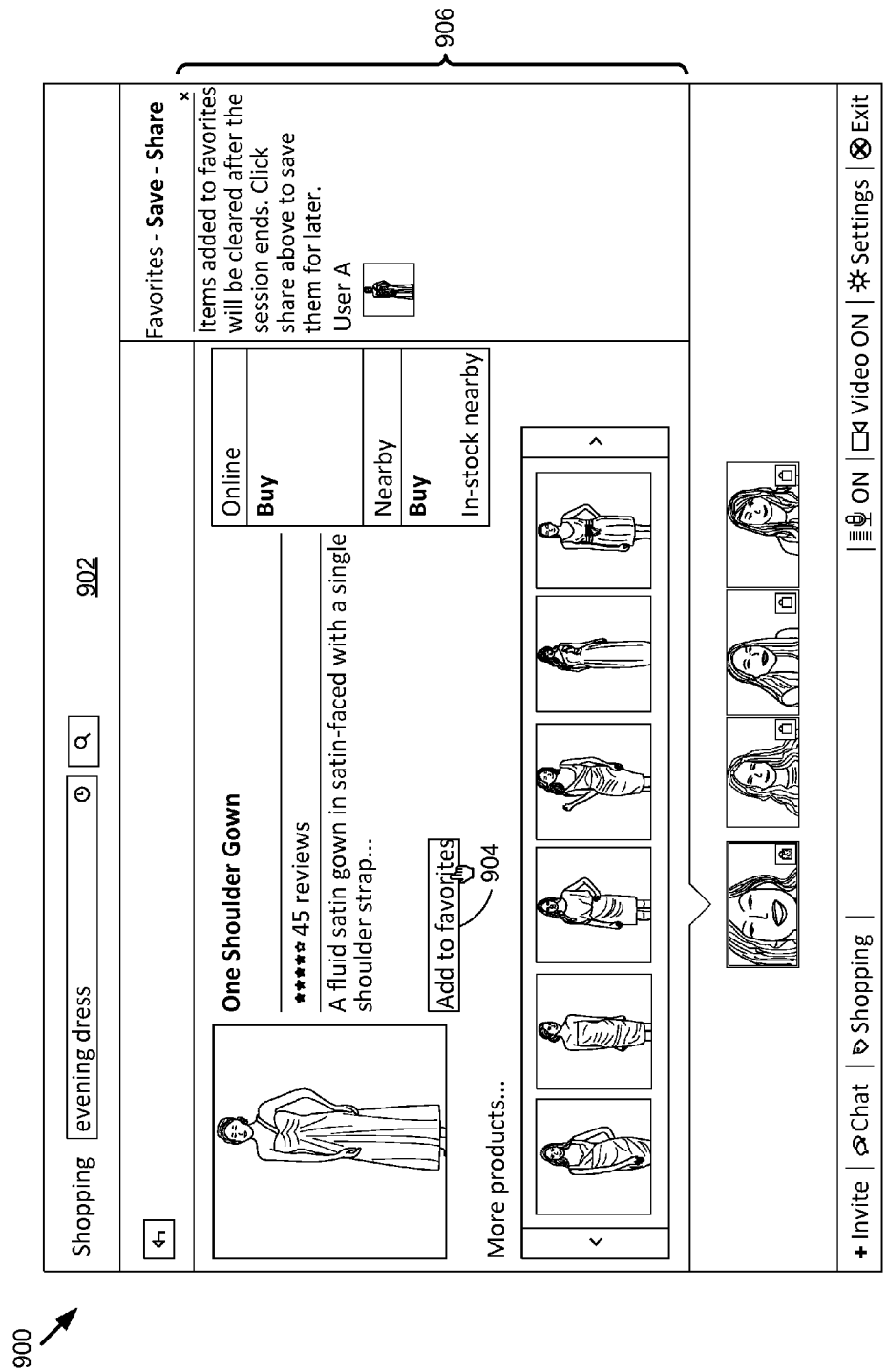
FIG. 9 is another example graphical user interface of a web portal for sharing an online search experience in accordance with another embodiment.

As seen in this FIG. 8, a selection 812 of a search result is shown. FIG. 9 illustrates what is displayed if the user selects the item of interest. As seen in FIG. 9, web portal 902 depicts what is shown after the selection of the item of interest. Here, the selection shows more detailed information about the item. Web portal 902 includes a button 904 that is selectable and allows a user to add the item to a favorites list 906 that is shown, in this example, on the right side of the screenshot 900. According to one embodiment, a selection and "addition to favorites" adds the item of interest to the selections storage database 502 of the selections module 226.

FIG. 10 is shows a graphical user interface 1000 of the web portal 1002 for sharing an online search experience in accordance with another embodiment. In this figure, secondary user "User B" has moused-over the item of interest 1004. According to what is displayed to users 810a, 810b, 810c and 810d, indication 1006 show these users that the users "User B is mousing-over the item of interest 1004. In some embodiments, the indication 1006 will appear after a secondary user has moused-over an item for more than a predetermined amount of time. In some embodiments, that predetermined amount of time can be more than two seconds. In some embodiments, the indication 1006 can appear when a secondary user selects on the item of interest.

FIG. 11 is an example graphical user interface 1100 of a web portal 1102 for sharing an online search experience in accordance with yet another embodiment. As seen in this illustration, a secondary user selects an item of interest 1104. The area 1106 displaying an interactive virtual session continues to show in the background according to what the primary user is doing. In this case, the primary user is scrolling and the items in the background are therefore scrolling accordingly. FIG. 12 shows this same concept as the scrolling in the background within the area 1106 displaying an interactive virtual session continues to scroll.

Figure 13:
FIG. 13 is an example graphical user interface of a web portal for sharing an online search experience in accordance with an embodiment.
Figure 14:
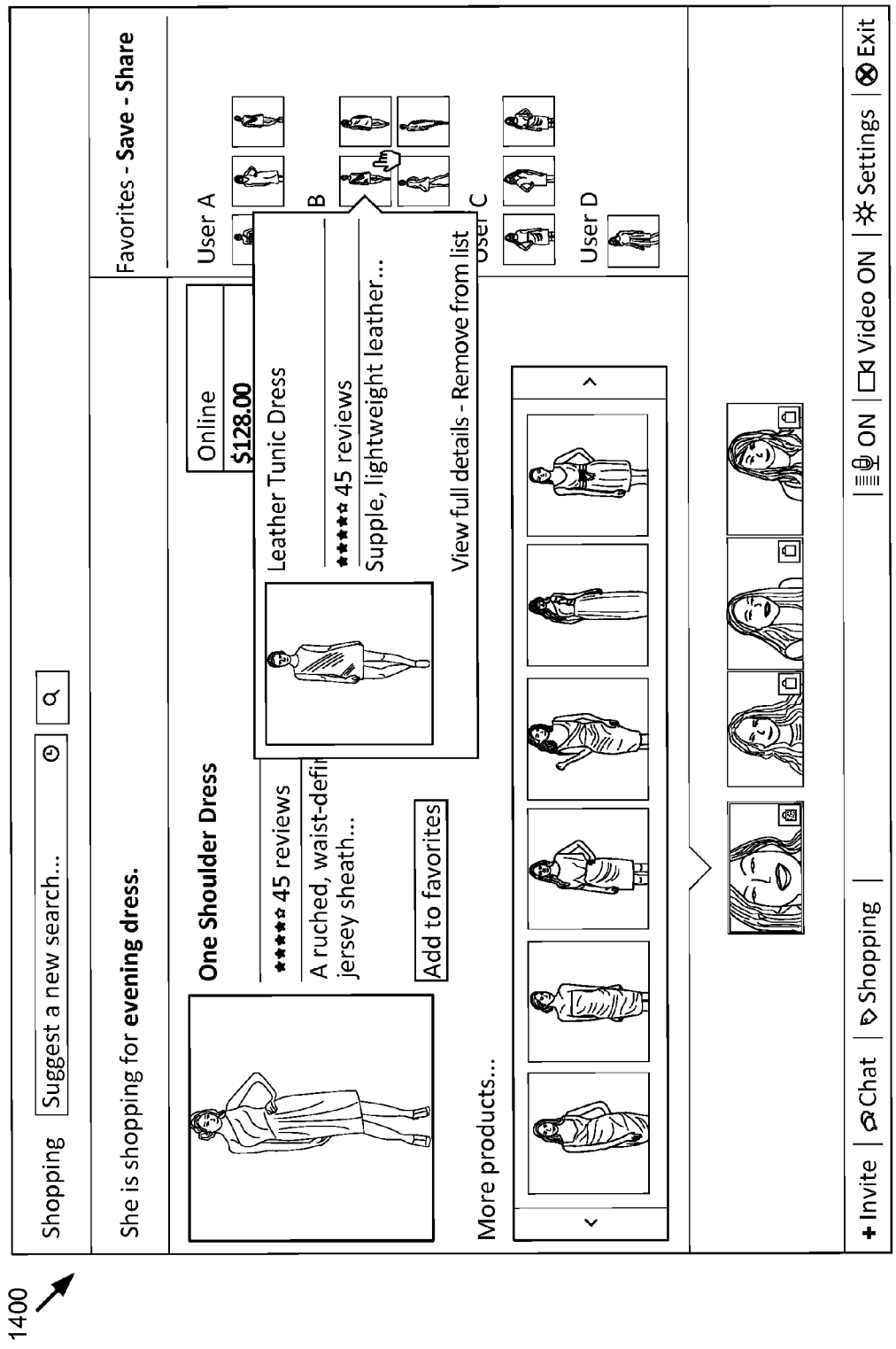
FIG. 14 is an example graphical user interface of a web portal for sharing an online search experience in accordance with yet another embodiment.

FIG. 13 is an example graphical user interface 1300 of a web portal 1302 for sharing an online search experience in accordance with an embodiment. As illustrated in this figure, a selection on one of the items in the favorites list is displayed. FIG. 14 shows that such selection displays additional information about the selected item.

Figure 15:
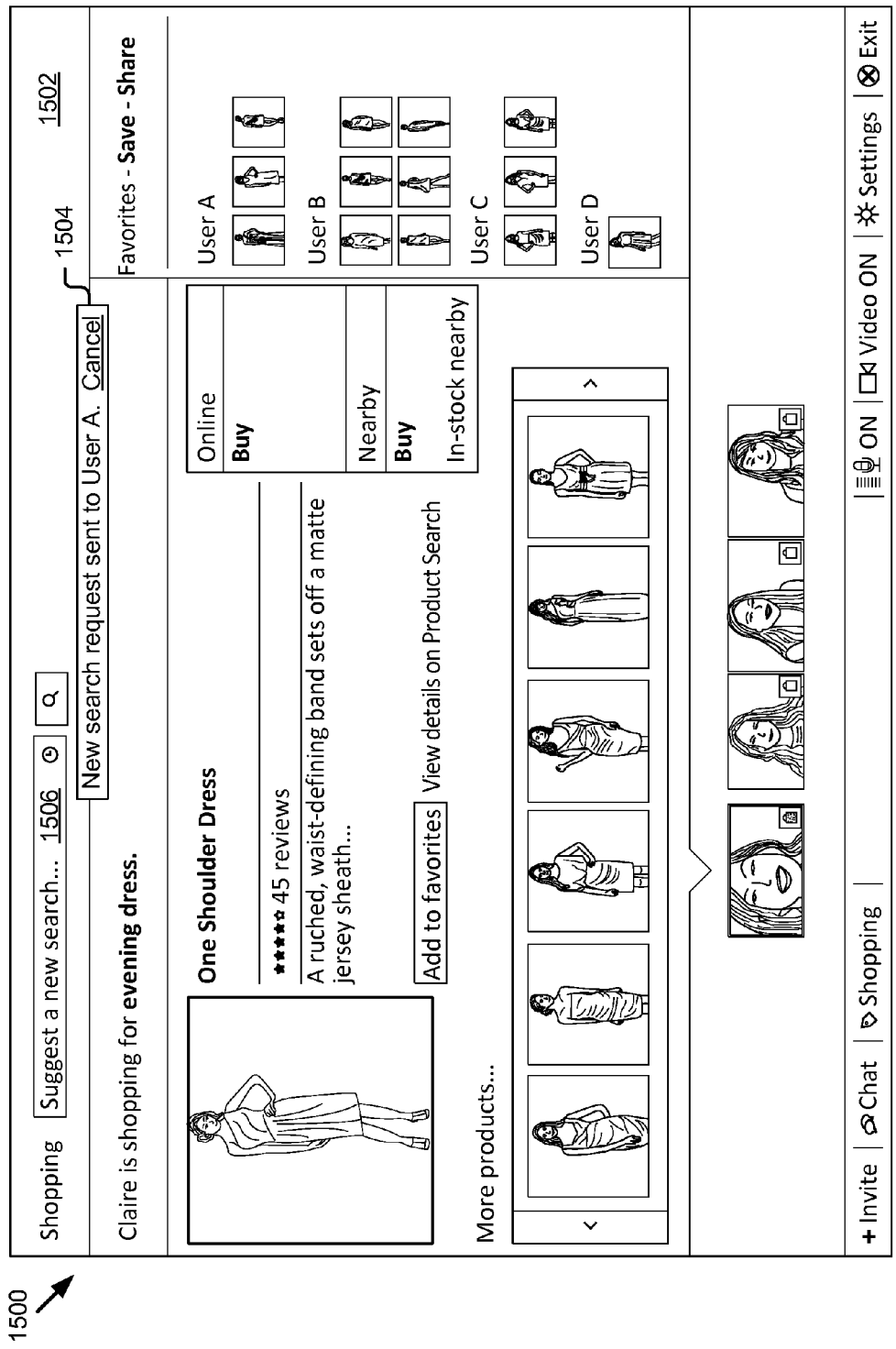
FIG. 15 is an example graphical user interface of a web portal for sharing an online search experience in accordance with another embodiment.
Figure 16:
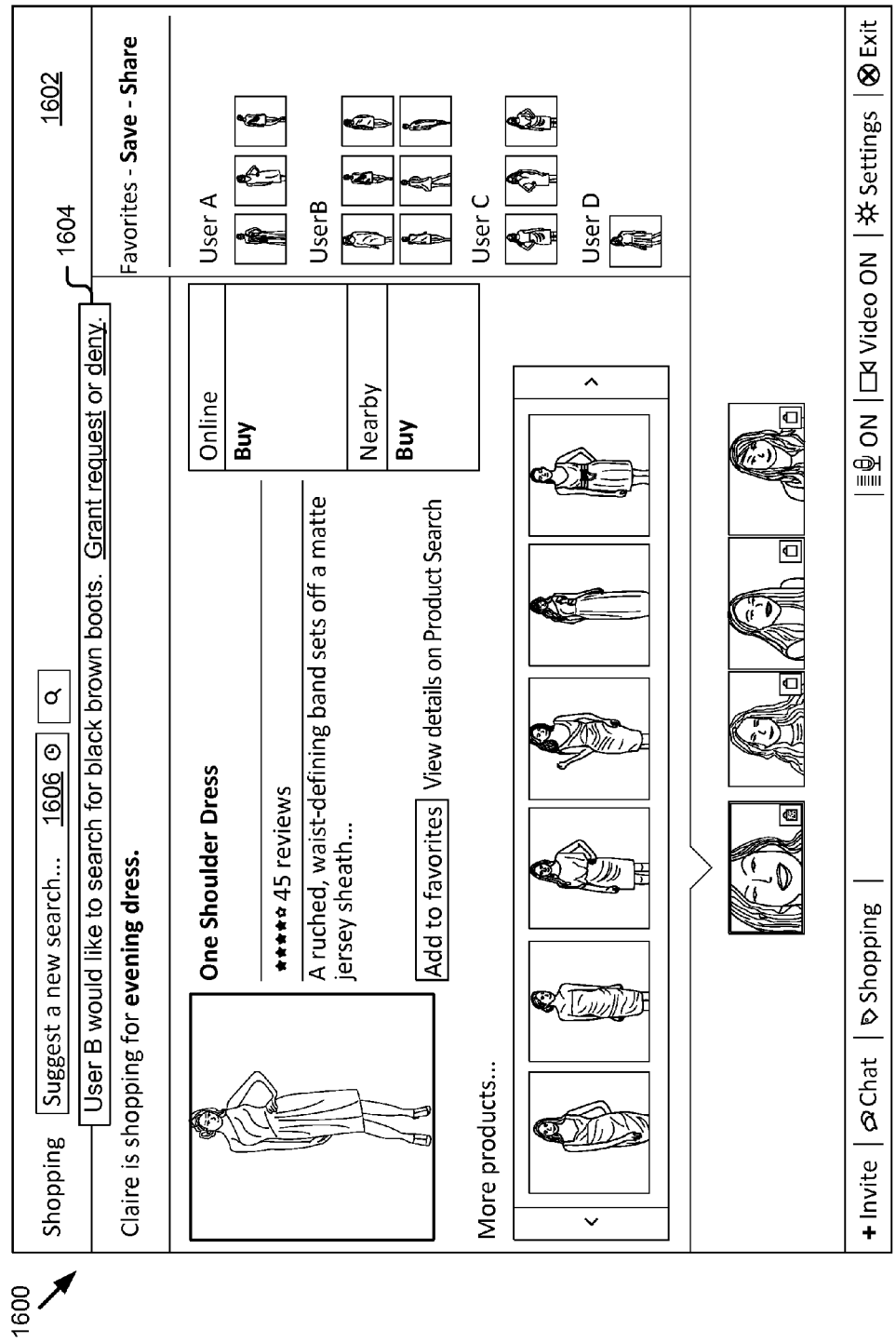
FIG. 16 is an example graphical user interface of a web portal for sharing an online search experience in accordance with yet another embodiment.
Figure 17:
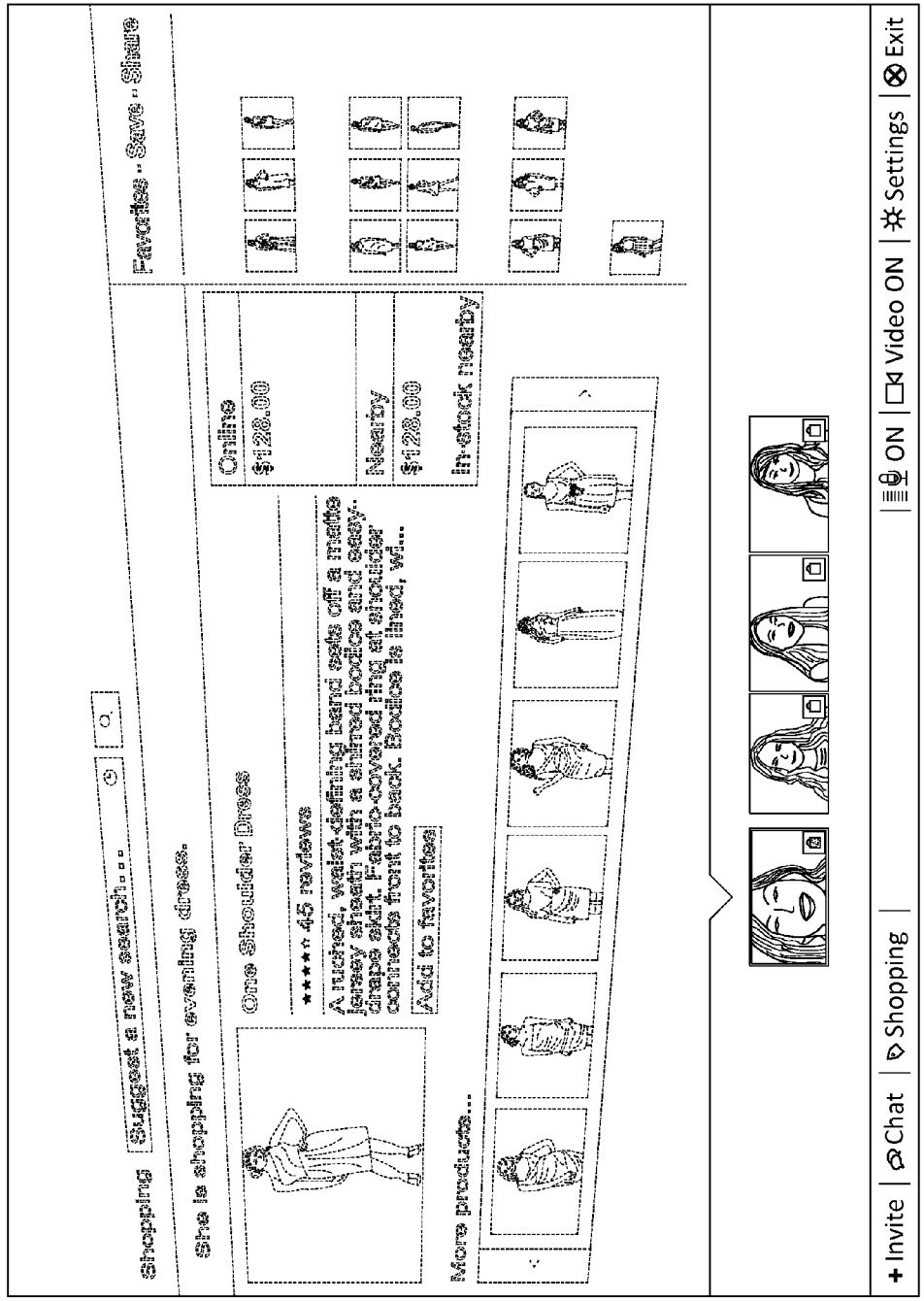
FIG. 17 is an example graphical user interface of a web portal for sharing an online search experience in accordance with one embodiment.
Figure 18:
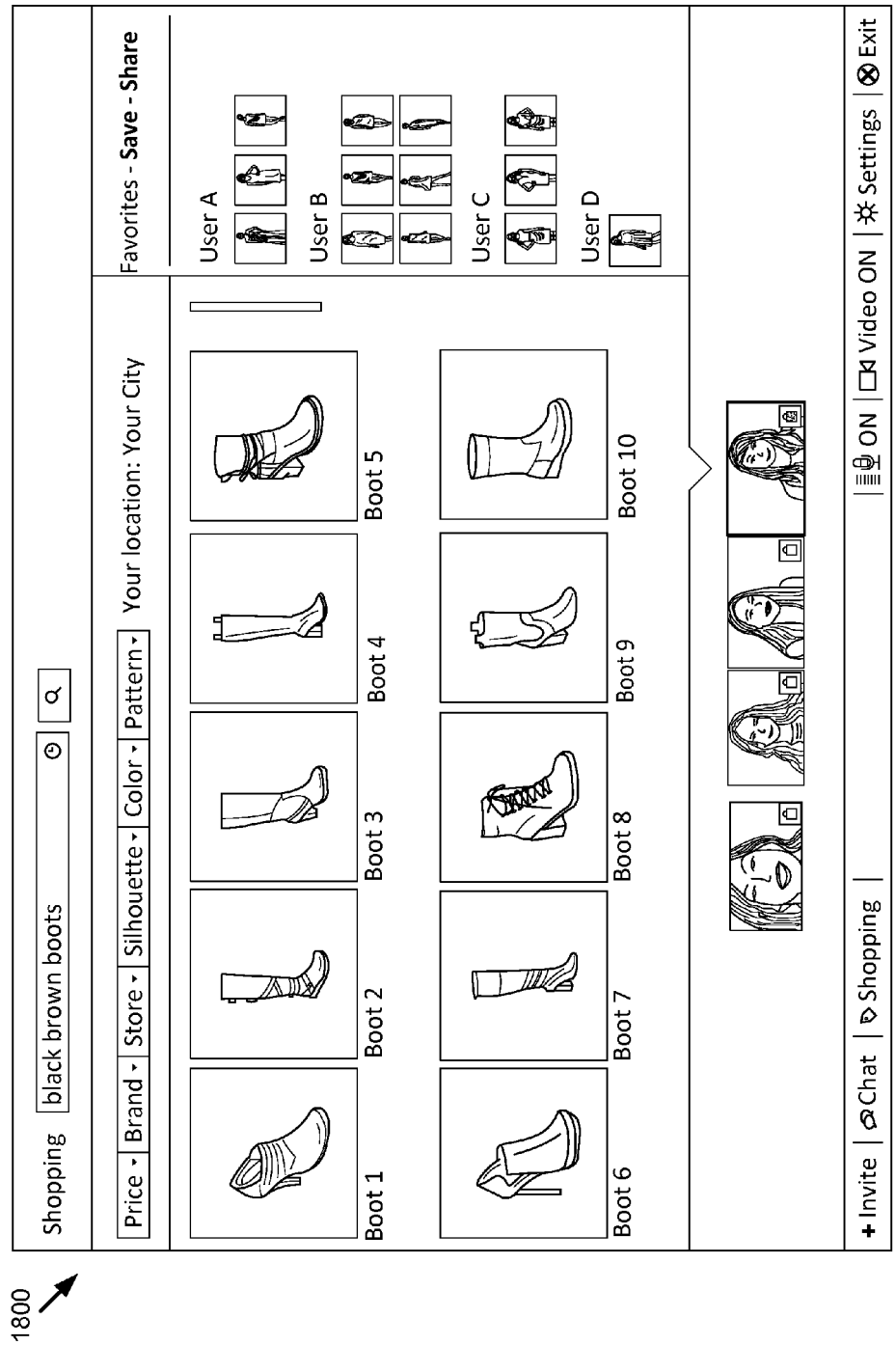
FIG. 18 is an example graphical user interface of a web portal for sharing an online search experience in accordance with another embodiment.

FIG. 15 is an example graphical user interface 1500 of a web portal 1502 for sharing an online search experience in accordance with another embodiment. As illustrated in FIG. 15, notification 1504 appears to the secondary user when the secondary user enters a search query into the search field 1506. As explained above, the system determines that the search query is coming from a secondary user and therefore treats that search query as a request from the secondary user to take over control of the search experience. When the secondary user enters a search query in the search field, FIG. 16 illustrates what is shown to the primary user. Here, as seen in FIG. 16, web portal 1602 includes notification 1604 to the primary user when a secondary user enters a search query into the search field 1606. The primary user can either grant the request or deny the request. If the request is denied, the primary user continues to have control over the search experience. In other words, the primary user continues to be able to enter search queries into the search field 1606 and search results continue to be generated. If the primary user grants the request, FIG. 17 illustrates what the user interface 1700 shows. In some embodiments, an animation shows that control from one user is being transferred to another user. In the embodiment shown in FIG. 17, a page-flip animation. In other embodiments, another indication may be shown on the web portal 1702.

The foregoing data/information can be collected upon user consent for generating, e.g., prediction models. In some implementations, a user can be prompted to explicitly allow data collection. Further, the user may opt in/out of participating in such data collection activities. Furthermore, the collected data can be anonymized prior to performing the analysis to obtain the various statistical patterns described above The foregoing description of the embodiments of the present disclosure has been presented for the purposes of illustration and description. It is not intended to be exhaustive or to limit the present embodiments to the precise form disclosed. Many modifications and variations are possible in light of the above teaching. It is intended that the scope of the present embodiments be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present embodiments or their features may have different names, divisions and/or formats. Furthermore, as will be apparent to one of ordinary skill in the relevant art, the modules, routines, features, attributes, methodologies and other aspects of the present embodiments can be implemented as software, hardware, firmware or any combination of the three. Also, wherever a component, an example of which is a module, of the present embodiments are implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiments are in no way limited to implementation in any specific programming language, or for any specific operating system or environment. Accordingly, the disclosure is intended to be illustrative, but not limiting, of the scope of the present embodiments, which is set forth in the following claims.

What is claimed is:

1. A computer-implemented method for allowing users to share an online search experience performed on one or more computing devices, the method comprising hosting, using the one or more computing devices, an interactive virtual session, wherein the interactive virtual session enables a primary user to control the interactive virtual session, the interactive virtual session being displayed at least in part on a computer associated with the primary user;

providing access to the interactive virtual session to at least one secondary user;

providing, on the one or more computing devices, a virtual multi-party communication space, wherein the virtual multi-party communication space enables the primary user and the at least one secondary user to communicate with each other, and wherein the virtual multi-party communication space is displayed as part of the interactive virtual session;

receiving a search query from a computer associated with the primary user, wherein the search query is associated with one or more items of interest;

determining, using the one or more computing devices, that the search query originated from the computer associated with the primary user;

responsive to determining that the search query originated from the computer associated with the primary user, sending data based on the search query to a computer associated with the at least one secondary user, the data representing the search query originating from the computer associated with the primary user;

receiving the data based on the search query from the computer associated with the at least one secondary user that was sent on behalf of the at least one secondary user without requiring input from the at least one secondary user at the computer associated with the at least one secondary user;

enabling the at least one secondary user to provide at least one secondary input indicating an action of the at least one secondary user within the interactive virtual session via the interactive virtual session;

determining, using the one or more computing devices, search results based on the received search query and data based on the search query and a display output based on the action of the at least one secondary user within the interactive virtual session; and sending the search results and the display output for display at the computer associated with the primary user and the computer associated with the secondary user as part of the interactive virtual session, wherein the search results include at least one representation of an item of interest in the one or more items of interest and the display output represents the action of the at least one secondary user within the interactive virtual session.

2. The computer-implemented method of claim 1, wherein the multi-party communication space includes a video communication interface.

3. The computer-implemented method of claim 1, further comprising:
enabling the primary user or the at least one secondary user to make a purchase of an item displayed on the items search and browsing interface of the shared environment.

4. The computer-implemented method of claim 1, further comprising:
providing a list area adjacent to the interactive virtual session, wherein the list area includes at least one item selected by the primary user or the at least one secondary user.

5. The computer-implemented method of claim 1, further comprising:
allowing the primary user to send the at least one selected item to at least one email address.

6. The computer-implemented method of claim 1, further comprising:
allowing the at least one secondary user to send the at least one selected item to at least one email address.

7. The computer-implemented method of claim 1, further comprising:
allowing the secondary user to provide at least one secondary input into the interactive virtual session.

8. The computer-implemented method of claim 1, further comprising:
displaying an indication upon a transition from the primary user controlling the interactive virtual session to the at least one secondary user controlling the interactive virtual session.

9. The computer-implemented method of claim 1, further comprising:
sending data to a social network account of at least one user, wherein the data includes information regarding the search results.

10. The computer-implemented method of claim 1, further comprising:
receiving at least one input from the at least one secondary user, wherein the input include a mouse-over on a search result.

11. A system for allowing users to share an online search experience, the system comprising:
one or more processors;
a server for hosting an interactive virtual session and providing access to the interactive virtual session to at least one secondary user;
a communication module, stored on a memory and executable by the one or more processors, for providing a virtual multi-party communication space, wherein the virtual multi-party communication space enables the primary user and the at least one secondary user to communicate with each other, and wherein the virtual multi-party communication space is displayed as part of the interactive virtual session;
an input receiver, stored on the memory and executable by the one or more processors, for receiving a search query from a computer associated with the primary user, wherein the search query is associated with one or more items of interest;
an input processing module, stored on the memory and executable by the one or more processors, for determining that the search query originated from the computer associated with the primary user;
an output generation module, stored on the memory and executable by the one or more processors, for sending data based on the search query to a computer associated with the at least one secondary user, the data representing the search query originating from the computer associated with the primary user;
a search module, stored on the memory and executable by the one or more processors, for receiving the data based on the search query from the computer associated with the at least one secondary user that was sent on behalf of the at least one secondary user without requiring input from the at least one secondary user at the computer associated with the at least one secondary user and enabling at least one secondary user to provide at least one secondary input indicating an action of the at least one secondary user within the interactive virtual session via the interactive virtual session;
a results processor, stored on a memory and executable by the one or more processors, for determining search results based on the received search query and data based on the search query and a display output based on the action of the at least one secondary user within the interactive virtual session;
an output generator, stored on a memory and executable by the one or more processors, for sending the search results and the display output to the computer associated with the primary user and the computer associated with the secondary user for display as part of the interactive virtual session, wherein the search results include at least one representation of an item of interest in the one or more items of interest and the display output represents the action of the at least one secondary user within the interactive virtual session.

12. The system of claim 11, wherein the interactive virtual session enables a primary user to control the interactive virtual session, the interactive virtual session being displayed at least in part on a computer associated with the primary user.

13. The system of claim 11, wherein the multi-party communication space includes a video communication interface.

14. The system of claim 11, wherein the search module further enables the one user to make a purchase of an item displayed on the items search and browsing interface of the shared environment.

15. The system of claim 11, wherein the display generation module further provides a list area adjacent to the interactive virtual session, wherein the list area includes at least one item selected by one of the users.

16. The system of claim 11, wherein the results generation module further allows the primary user to send the at least one selected item to at least one email address.

17. The system of claim 11, wherein the results generation module further allows the at least one secondary user to send the at least one selected item to at least one email address.

18. The system of claim 11, wherein the search module further allows the at least one secondary user to provide at least one secondary input into the interactive virtual session.

19. The system of claim 11, wherein the display generation module further displays an indication upon a transition from the primary user controlling the interactive virtual session to the at least one secondary user controlling the interactive virtual session.

20. The system of claim 11, wherein the display generation module further sends data to a social network account of at least one user, wherein the data includes information regarding the search results.

21. The system of claim 11, further comprising:
a secondary input receiver module for receiving least one secondary input from the at least one secondary user.

22. The system of claim 21, wherein the input include a mouse-over on a search result.

23. A non-transitory computer readable medium with encoded instructions thereon that, in response to execution by a computing device, cause the computing device to perform operations comprising:
hosting, using the one or more computing devices, an interactive virtual session, wherein the interactive virtual session enables a primary user to control the interactive virtual session, the interactive virtual session being displayed at least in part on a computer associated with the primary user;
providing access to the interactive virtual session to at least one secondary user;
receiving a search query from a computer associated with the primary user, wherein the search query is associated with one or more items of interest;
determining that the search query originated from the computer associated with the primary user;
responsive to determining that the search query originated from the computer associated with the primary user, sending data based on the search query to a computer associated with the at least one secondary user, the data representing the search query originating from the computer associated with the primary user;
receiving the data based on the search query from the computer associated with the at least one secondary user that was sent on behalf of the at least one secondary user without requiring input from the at least one secondary user at the computer associated with the at least one secondary user;
enabling the at least one secondary user to provide at least one secondary input indicating an action of the at least one secondary user within the interactive virtual session via the interactive virtual session;
determining, using the one or more computing devices, search results based on the received search query and data based on the search query and a display output based on the action of the at least one secondary user within the interactive virtual session; and
sending the search results and the display output for display at the computer associated with the primary user and the computer associated with the secondary user as part of the interactive virtual session, wherein the search results include at least one representation of an item of interest in the one or more items of interest and the display output represents the action of the at least one secondary user within the interactive virtual session.

24. A system for allowing users to share an online search experience, including one or more computing devices configured to perform the following steps of:
hosting, using the one or more computing devices, an interactive virtual session, wherein the interactive virtual session enables a primary user to control the interactive virtual session, the interactive virtual session being displayed at least in part on a computer associated with the primary user;
providing, on the one or more computing devices, a virtual multi-party communication space, wherein the virtual multi-party communication space enables the primary user and the at least one secondary user to communicate with each other, and wherein the virtual multi-party communication space is displayed as part of the interactive virtual session;
providing access to the interactive virtual session to at least one secondary user;
receiving a search query from a computer associated with the primary user, wherein the search query is associated with one or more items of interest;
determining that the search query originated from the computer associated with the primary user;
responsive to determining that the search query originated from the computer associated with the primary user, sending the search query to a computer associated with the at least one secondary user, the data representing the search query originating from the computer associated with the primary user;
receiving the search query from the computer associated with the at least one secondary user;
enabling the at least one secondary user to provide at least one secondary input indicating an action of the at least one secondary user within the interactive virtual session via the interactive virtual session;
determining, using the one or more computing devices, search results based on the received search query and data based on the search query and a display output based on the action of the at least one secondary user within the interactive virtual session; and
sending the search results and the display output to the computer associated with the primary user and the computer associated with the at least one secondary user for display as part of the interactive virtual session, wherein the search results include at least one representation of an item of interest in the one or more items of interest and the display output represents the action of the at least one secondary user within the interactive virtual session.

25. The system of claim 24, wherein the multi-party communication space includes a video communication interface.

* * * * *